United States Patent [19]

Schiessl

[11] Patent Number: 4,898,271
[45] Date of Patent: Feb. 6, 1990

[54] METHOD AND DEVICE FOR SIGNALING OF A BACK-UP ON A CONTAINER CONVEYOR

[75] Inventor: Hans Schiessl, Pforzheim, Fed. Rep. of Germany

[73] Assignee: Krones AG Hermann Kronseder Maschinenfabrik, Neutraubling, Fed. Rep. of Germany

[21] Appl. No.: 787,321

[22] Filed: Oct. 10, 1985

[30] Foreign Application Priority Data

Oct. 19, 1984 [DE] Fed. Rep. of Germany ..... 34383581

[51] Int. Cl.⁴ .............................................. B65G 47/26
[52] U.S. Cl. .................................... 198/444; 198/460; 198/464.3; 198/464.4; 198/572
[58] Field of Search ....................... 198/460, 444, 464.3, 198/464.4, 502.1, 572, 573, 810, 856; 250/223 R, 223 B

[56] References Cited

U.S. PATENT DOCUMENTS

| | | | | |
|---|---|---|---|---|
| 4,190,146 | 2/1980 | Knuchel | ............................... | 198/460 |
| 4,355,712 | 10/1982 | Bruno | ................................... | 198/460 |
| 4,514,963 | 5/1985 | Bruno | ................................... | 198/460 |

FOREIGN PATENT DOCUMENTS 1261348 2/1968 Fed. Rep. of Germany .
3313030 10/1984 Fed. Rep. of Germany .

Primary Examiner—Joseph E. Valenza
Attorney, Agent, or Firm—Fuller, Puerner & Hohenfeldt

[57] ABSTRACT

In apparatus for the signaling of a back-up in a container conveyor, the actual translation speed of all containers passing a measuring zone is determined separately with the aid of the measuring of the transit time and compared with the simultaneously measured momentary travel velocity of a hinge-belt-chain conveyor. If the translation speed of the containers is smaller by a determined amount than the travel velocity, or in a predetermined relationship, a jam or back-up signal is produced. The device has two photodetectors arranged at the same level with a fixed spacing in the direction of bottle transportation. A sensor registers the presence of a bottle in the measuring zone. A tachometer generator is attached to the drive shaft of the conveyor and provides an analog signal to a processor indicative of conveyor speed.

6 Claims, 1 Drawing Sheet

METHOD AND DEVICE FOR SIGNALING OF A BACK-UP ON A CONTAINER CONVEYOR

BACKGROUND OF THE INVENTION

The invention is a method and device for monitoring occurrence of a back-up or a jamming of containers on a conveyor which conveys the containers by frictional contact between the conveyor and containers.

So called jam or back-up sensors are applied to conveyor or treatment systems for containers for a variety of monitoring and control functions. The purpose is to signal a speed increase and open the container gate when a back-up at its infeed conveyor occurs and to signal a speed decrease and close the container gate when a back-up occurs at its discharge side as in German Patent No. 1,803,332.

One known type of jam or back-up sensing device detects container offset or deflection from the normal line of travel in a control zone which offset results from pressure between containers flowing in a line. The offset sensor is connected to a switch which converts a mechanical force to an electric signal. Such a system is described in German Patent Specification No. 922,517. This device can only be applied where the conveyed containers have a special shape such as bulbous midsections which are subject to lateral shifting from the line of movement when there is a blockage. It cannot be used for containers with parallel walls such as special shaped square bottles. In its function, it depends largely on the coefficient of friction between the conveying medium and the container, the container weight, the type of chain lubrication or the condition of the conveyor and reacts only after the line pressure or slippage between the conveyor and the containers has exceeded a certain value. This known type of jam switch reacts relatively slow and imprecisely. The bottle offset in the sensing region, furthermore, causes undesirable lateral movement of the containers which results in an increased noise level, especially where glass containers are involved.

Another known device for signaling a back-up is especially for cases where the containers are conveyed in a single lane as in German Laid Open Patent Specification No. 1,261,348. This system uses two photocells with crossing light beams and a processing unit. One of the two photocells responds to a beam at right angles to the container flow and is used to count the containers passing the control zone within a given time so it provides an indications of the existing conveying rate. The second photocell, mounted at an acute angle to the container flow, checks for the presence of containers in the control zone. If the first photocell does not emit a counting pulse, although the second cells sees containers in the area of the control zone, a back-up signal is emitted. Thus, this back-up signal is emitted when the containers are at a complete standstill regardless of whether the conveyor continues to run or not. The system does not differentiate between a real back-up where the conveyor continues to run and a complete stop of the conveyor. Further, this device does not produce a back-up signal when the conveyor chain slippage is more or less under the containers as long as the containers pass the control point. In this case, the shift register connected to the first photocell interprets the signal as "low speed". The described condition, where the conveyor slips under the containers, frequently occurs on all conveying or packaging system and cannot, therefore, be detected with a known device under discussion. The device does not meet the desired objectives.

SUMMARY OF THE INVENTION

A primary object of the present invention is to provide a method and device for monitoring and signaling a back-up on a container conveyor which device is sensitive and fast acting and is dependent on friction conditions between the conveyor and containers nor on the cross-sectional shape of the containers.

A further object is to provide a method and device which detects characteristic slippage between containers and the conveyor without depending on the development of line pressure and subsequent container offset. The method, therefore, is especially useful in bottle treatment lines because it functions independently of the shape, friction conditions between the conveyor and bottles and without disturbing the flow of the bottles.

In addition, a back-up can be detected very early when slippage is relatively low. It is not absolutely necessary to compare absolute values such as conveyor speeds and bottle speeds, especially when both values can be expressed in terms of a ratio. Both values do not even have to be expressed in the same units.

In accordance with the invention, it is entirely possible to compare the container speed, obtained by measuring elapsed time, that the bottles spend in a control zone, with a direct measurement of the containers or bottles being conveyed as expressed in terms of rpm of the conveyor drive shaft in terms of a ratio. Thus, measurement in the context of the invention means simply that for the relative speed of the container as well as the linear speed of the conveyor, characteristic values can be obtained that are expressed in a specific ratio when the conveyor is functioning normally in a free-flow mode. Accuracy is optimized by measuring the speed of the conveyor and the speed of the containers at the same time.

A further feature of the invention is that it generates a back-up signal only when deviation from the free-flow mode exceeds a predetermined value. This eliminates inaccurate measurements such as when there is acceleration related to slippage of the conveyor chain. A back-up signal is only generated in the case of an actual back-up. The invention does not only provide a control signal indicative of a back-up but it also indicates the intensity of the back-up based on the amount of slippage between the container and conveyor. The invention is applicable to single lane and multiple lane conveyance of containers.

In order to obtain stable calibration, a control zone is used to separately measure the exact speed of the container relative to the conveyor within the control zone.

The new device is universally applicable to containers such as bottles and to packaging equipment. It is equally sensitive and accurate regardless of the container shape or friction conditions that exist.

How the foregoing objectives of the invention are achieved and implemented will be evident in the description of referred embodiment of this invention which will now be set forth in reference to the drawings.

DESCRIPTION OF A PREFERRED EMBODIMENT

Figure 1:
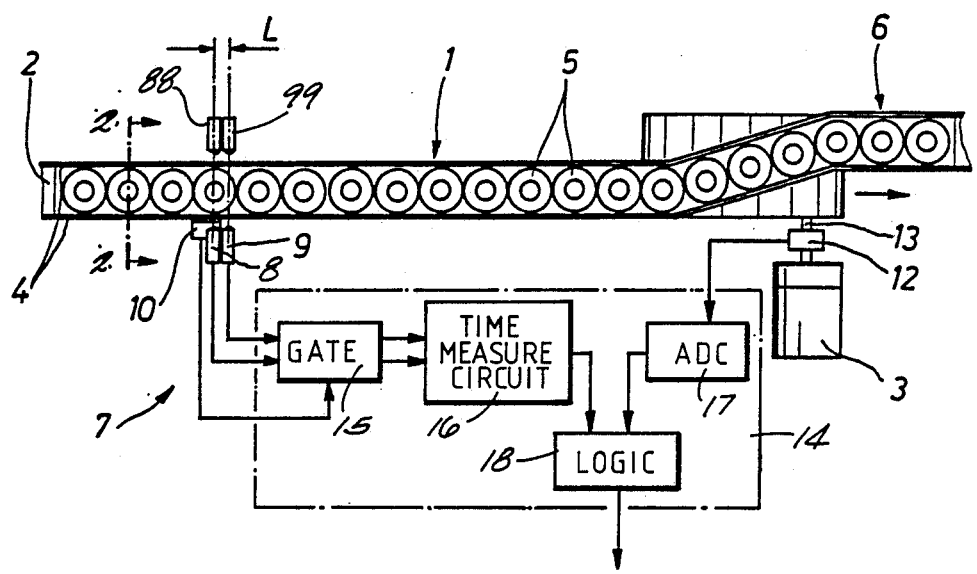
FIG. 1 is a plan view of a container conveying system in which the new back-up detection means is incorporated and wherein said means is depicted in block form.
Figure 2:
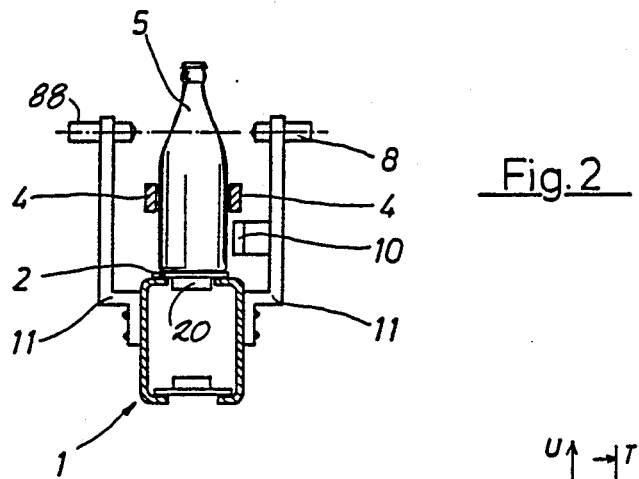
FIG. 2 is a section taken on a line corresponding to 2—2 in FIG. 1.

In FIG. 1 the conveyor system is designated generally by the reference numeral 1. The conveyor comprises a chain 20, as shown in FIG. 2, which carries a series of abutting plates 2. The conveyor is driven by a combination motor and speed reducer 3 in the direction indicated by the arrow next to the motor. In this embodiment, side rails 4 guide the containers such as bottles into a single lane. The bottles 5 in this case are standing upright and are fed to the conveyor assembly by a mechanism, not shown, in a more or less continuous single row. A second conveyor section 6 is similar to conveyor 1 and is connected in series with conveyor 1. Conveyor 6 might direct the bottles to a bottle treating station such as a filling station or a label application station. Any apparatus at the station is driven synchronously with conveyor 6. The guide rails 4 are appropriately shaped to guide the bottles 5 at the end of conveyor system 1 into the following conveyor system 6.

The back-up or jam detection system is generally designated by the numeral 7 and is located along conveyor 1 upstream from the second conveyor 6. The detection system includes two light sources 88 and 89 which project light beams across the line of movement of the containers towards photodetectors 8 and 9, respectively. The scanning beams are projected at a level between the body and neck of bottles 5 as can be seen in FIG. 2. The proximity of photodetector 8 to photodetector 9 is less than the diameter of the bottles at the level of both photodetectors. The distance between the two photodetectors for standard soft drink bottles is, for example, 30 mm.

Photodetectors 8 and 9 are mounted parallel to each other and at right angles to the line along which the conveyed bottles move. Thus, the photodetectors both respond, to the same point on a bottle 5 and provide two similar signals which are illustrated in the FIG. 3 timing diagram. The timing sequence T of both signals, thus, registers the elapsed time for bottle 5 to travel past both photodetectors in control zone L. In the illustrated example, the signal is taken from the leading edge so the duration of the signal is of no consequence. The actual transport speed of bottle 5 is derived from the known constant length of the control zone L and the measured elapsed time T which are completely independent of the momentary speed of the chain conveyor 2. Device 7 includes a third container sensor in the form of a proximity sensor 10 which is located below the photodetectors 8 and 9. Sensor 10 and sensors 8 and 9 are mounted on two fixed brackets 11 which, in turn, are mounted to the conveyor frame 1.

Proximity sensor 10 works in conjunction with sensors 8 and 9 in that it produces a signal as long as a bottle 5 is within the control zone. The signal begins shortly before the leading bottle edge reaches photodetector 8 and ends shortly after the leading bottle edge passes the second photodetector 9. Sensor 10, thus, measures the timing interval T and prevents the processing of false signals from photodetectors 8 and 9.

The apparatus also includes a tachometer 12 which produces an analog electric signal corresponding to the rate at which motor 3 drives the conveyors. In other words, the tachometer signal is precisely proportional to the translational speed of the conveyor. The tachometer is connected to the drive shaft 13 of chain conveyor 2 and provides an impulse, derived from the gaps in the chain links and the drive sprocket.

Figure 3:
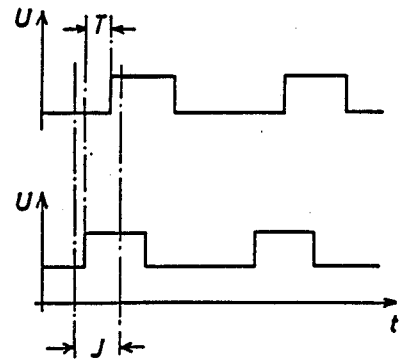
FIG. 3 is a timing diagram showing the relationship between detected signals.

Both photodetectors 8 and 9, sensor 10 and the tachometer generator 12 are connected to a common signal processing unit 14 which is analagous to a microcomputer. The signal processing means are embraced in the dash-dot line rectangle 14. The processing unit 14 includes a gate 15 which is actuated by proximity sensor 10 to accept signals from photocells 8 and 9 only during the timing interval J as can be seen in FIG. 3. A time measuring circuit 16 is connected to gate 15 and measures the elapsed time T between the leading signal edge of both photodetectors 8 and 9 in milliseconds or a time unit that corresponds to the cycle time of the microcomputer that happens to be used.

The processor 14 includes an analog-to-digital signal converter (ADC) 17 that digitizes the analog signal of the tachometer generator 12 at certain time intervals and stores the last calibration value until the next calibration. The time intervals are extremely short and consequently the ADC 17 constantly provides new values of the speed of the conveyor chain 2.

The central element of the processor unit 14 is the logic unit 18 which processes signals from measuring unit 16 which, in turn, characterizes the speed of bottle 5 translation and the signals from ADC 17 which characterizes the momentary speed of chain conveyor 2. Depending on the signal type, this is possible in various ways, for example, through making differential measurements. There is an advantage, however, in forming a quotient between the conveyor speed and bottle transport speed since a quotient or ratio is independent of the units in which the bottle transport speed and the conveyor speed are expressed. The reference basis is the quotient or ratio at a time when the bottles are flowing without impediment in the absence of a back-up which means that the transport speed of the bottles and the linear speed of the table top conveyor chains 2 and 6 are the same. If the transit time of a bottle in the control zone is determined by measuring unit to provide ten units 16, for example, and the ADC five units, the reference quotient is 2.0 at all speeds of the conveyor chain. When the direct measurement of the transport speed of the bottle has a value of only eight units, which translates to a chain slippage of 20%, the reference quotient would be 1.6. Logic unit 18 is tuned or programmed to produce a back-up signal only when chain slippage exceeds 10%, that is, when the bottles are moving at a rate of less than 90% of conveyor speed which, based on the above example, results in a reference quotient of 1.8.

Minor slippage during acceleration or deceleration of the table chain conveyor 2 or a bottle contact with the guide rails 4 does not affect accuracy. In the simplest case, for example, with a two speed modulation of a packaging machine, the logic unit provides a "no back-up" or a "back-up" signal whereby both extremes of the slippage range can be clearly defined.

With the continuous speed monitoring of the conveyor systems, however, it is preferable when the back-up signal is varied on the basis of slippage value, for example, between zero and ten volts, corresponding to 0% (no back-up) to 100% (complete standstill of the bottle). This enables a particularly sensitive monitoring of an impact free and quiet operation between two conveying systems. Because the translational speed of each bottle passing through the control zone is measured and compared with the prevailing or momentary conveyor chain speed, continuous monitoring is possible end there is a quick response and detection in the earliest instant of the back-up phase.

I claim:

1. A device for detecting a back-up of bottles being transported on a conveyor, said device comprising:

means for projecting two beams from one to the other side of the path in which said bottles are transported on said conveyor through a measuring zone, said beams being directed at a level such that the beams are interrupted by a region in said bottles between the widest portion of the bottle and the mouth of the bottle, detectors arranged on said other side of the conveyor in line with said beams, respectively, with a predetermined spacing between them, said detectors each producing a timing signal coincident with the leading edge of a moving bottle interrupting the beams consecutively, signal processor means having input means for said signals and using the timing signals and spacing between beams to provide a signal representative of the transport speed of said bottles, means for producing a signal representative of the speed of the conveyor and means supplying said signal to said processor means, said processor means responding to existence of a predetermined relationship between said bottle speed and said conveyor speed signals by producing a signal indicative of a back-up.

2. The device according to claim 1 including a sensor for producing a signal indicating when a bottle is present in said measuring zone, gate means controlled by said last named signal to gate said timing signals that are next produced to said signal processor means.

3. The device according to claim 1 wherein said processor means produces a signal indicative of a back-up response to the ratio of said conveyor speed relative to said bottle speed exceeding a predetermined value.

4. The device according to claim 1 wherein said processor means produces a signal indicative of a back-up in response to the difference between said conveyor speed and said bottle speed exceeding a predetermined value.

5. The device according to claim 1 including a motor and means including rotating elements for operatively coupling said motor in driving relation with said conveyor, said means for producing a signal representative of the speed of the conveyor comprising a tachometer driven by one of said rotating elements.

6. A method of producing a signal indicative of a back-up among a series of bottles being transported on a conveyor under the influence of friction primarily between the bottles and the conveyor, said method comprising the steps of:

establishing a measuring zone along the path in which the bottles are being transported on the conveyor, determining the velocity of a bottle in said measuring zone and continuously measuring the velocity of said conveyor, comparing the velocity of said bottle with the velocity of said conveyor and producing a signal representative of a back-up existing if the velocity of the conveyor is greater than the velocity of the bottle by a predetermined amount.

* * * * *